Fig. 1

Patented Aug. 22, 1933

1,923,284

UNITED STATES PATENT OFFICE 1,923,284

SPIRAL PIPE WELDING MACHINE

James Hall Taylor and Edward Hall Taylor, Chicago, Ill.

Application January 12, 1931, Serial No. 508,115
Renewed January 19, 1933

27 Claims. (Cl. 219—6)

This invention relates to the winding of spiral pipe from a metal strip or skelp, and has to do more particularly with a machine for continuously winding the skelp into spiral form and welding together the adjacent edges of the convolutions of the skelp during winding thereof.

One of the objects of our invention is to provide a machine for winding the skelp spirally to form a pipe and welding together the edges of the coils of the pipe thus formed. A further object is to provide a machine, which machine winds the skelp under tension about a forming surface or mandrel, means being provided for welding the edges of the skelp during winding thereof and while the skelp is under tension about the mandrel. Another object is to provide means for welding the skelp efficiently and expeditiously. Further objects and advantages of our invention will appear from the detail description.

We have illustrated, by way of example, a machine suitable for practising our invention. This machine includes a base 1 and uprights 2, 3, 4 and 5, conveniently formed integrally with and extending upwardly from the base. A frame 6, disposed lengthwise of the base, is suitably secured to the upper ends of uprights 2 and 3 and defines therewith split bearing sleeves 7 and 8. A tubular shaft 9 is rotatably mounted in sleeves 7 and 8, one end of this shaft projecting rearwardly of the machine beyond sleeve 8. A split collar 10 is suitably secured to shaft 9, as by cap screws 11, and abuts the forward end of sleeve 8. This collar cooperates with an outer annular flange 12, formed integrally with the shaft adjacent the rearward end thereof and abutting the rearward end of sleeve 8, to hold shaft 9 against endwise movement. A spur gear 13 fits about the rearward end of shaft 9 and is suitably secured, as by bolting, to flange 12. This gear meshes with a spur pinion 14 secured upon a stub shaft 15 rotatably mounted in bearing members 16 suitably secured to upright 5. An electric motor 17 is suitably mounted upon an extension 1ª of the base, the rotor shaft of this motor having driving connection to shaft 15 through a suitable flexible connection 18 of known type.

Figure 1:
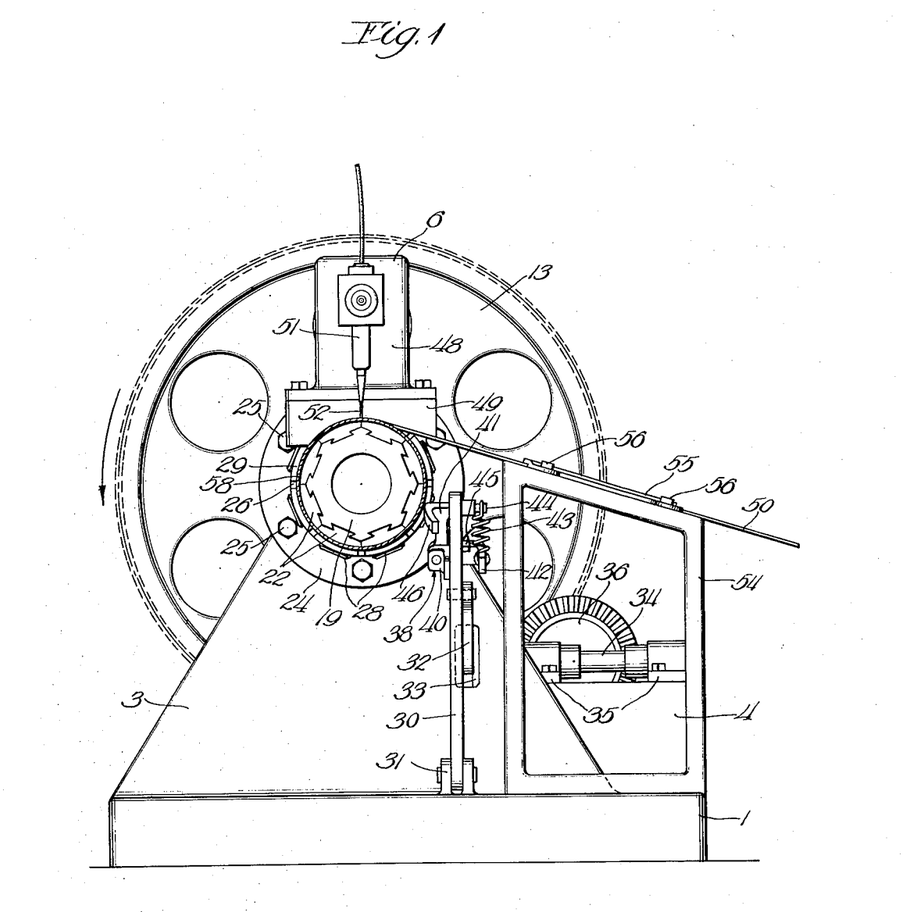
Figure 1 is a front view of a machine in accordance with our invention.
Figure 2:
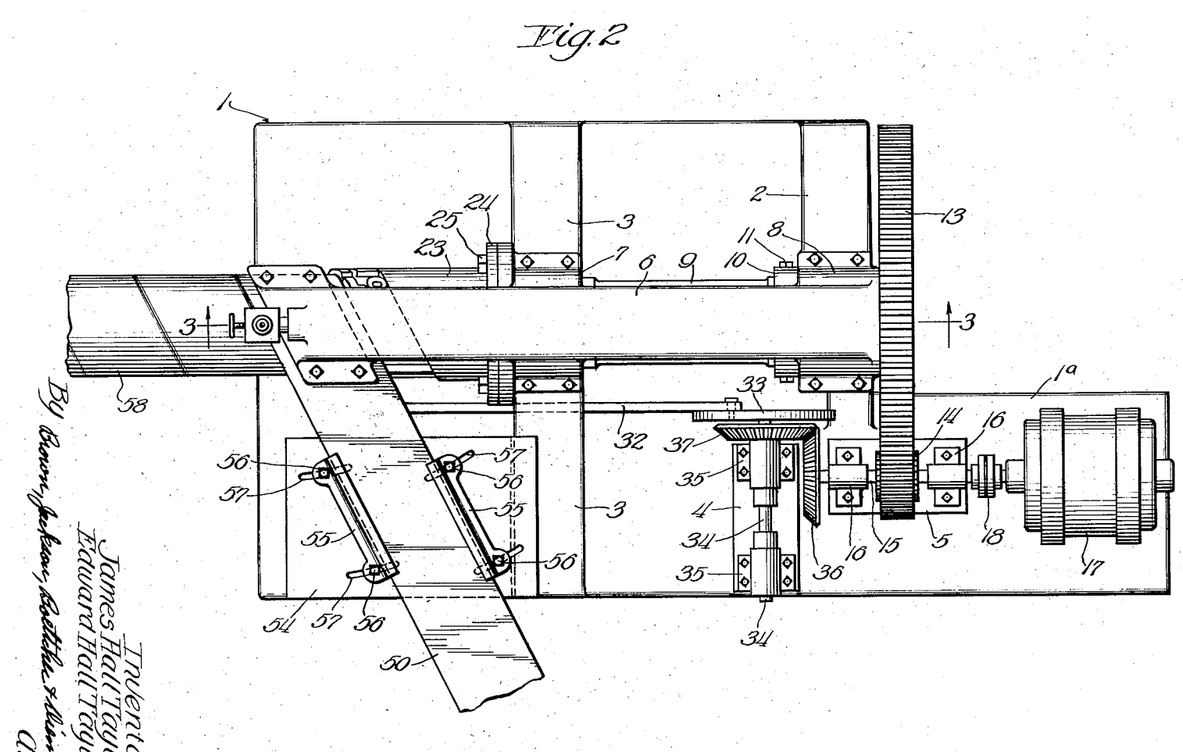
Figure 2 is a plan view of the machine.
Figures 5, 6, 7, 8:
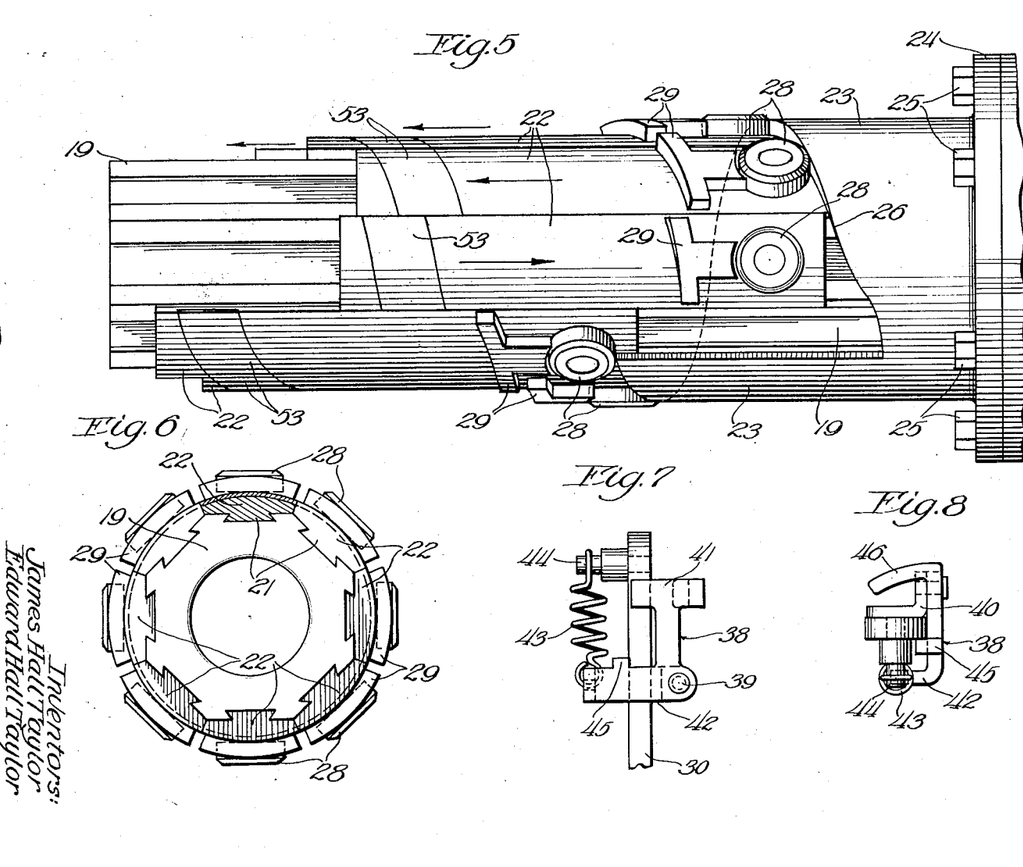
Figure 5 is a detail side view, on an enlarged scale, of the mandrel and cam member and associated parts.
Figure 6 is an outer end view of the mandrel structure, one of the key blocks being shown in section, on an enlarged scale.
Figure 7 is a detail elevation of the pull back lever and the associated latch means, on an enlarged scale.
Figure 8 is a plan view of the pull back lever and the associated latch means, on an enlarged scale.

A spindle 19 is bolted, or otherwise suitably secured, to the forward end of shaft 9 and coaxially therewith. This spindle is provided with spaced dovetail grooves 20 extending lengthwise thereof, which slidably receive correspondingly shaped tongues 21 at the inner faces of key blocks 22. The spindle has the form of a regular polygon in cross-section (Figs. 1 and 6) and the inner faces of blocks 22 are flat and seat upon the respective faces of the spindle. In the form illustrated, there are eight blocks 22 and the spindle is of octagonal cross-section. The number of blocks may be varied as desired or as conditions may require, the cross-section of the spindle being varied accordingly. The key blocks are disposed with their lateral faces in abutting relation and have their outer faces arched concentrically with the axis of the spindle, forming a continuous mandrel structure of cylindrical cross-section about which the skelp is wound.

A cam sleeve 23, provided at its rearward end with an outer peripheral flange 24, is suitably secured to frame 6 and upright 3, as by means of cap screws 25. This sleeve is disposed concentrically with the mandrel, and has its outer end shaped to provide a cam surface 26 of substantially spiral formation which extends about the mandrel. The rearward end of cam surface 26 is connected to the forward end thereof by a straight shoulder 27 extending lengthwise of sleeve 23 and parallel to the axis thereof. Each of the blocks is provided with a thrust roller 28 suitably mounted upon the outer face of the block adjacent the rearward end thereof, and with an outwardly projecting pressure and guide strip 29 conveniently formed integral with the block and disposed adjacent and outwardly beyond the roller. Strips 29 are inclined transversely of the blocks, and the forward or outer faces of these strips are disposed to contact the rearward edge of the skelp as it is wound upon the mandrel, as will be hereinafter more fully explained.

A pull back lever 30 is pivoted at its lower end between a pair of ears 31 extending upwardly from, and conveniently formed integral with base 1. This lever is reciprocated by means of a link 32 pivoted at one end to the lever, the other end of this link being pivoted to a disc 33 eccentrically thereof. Disc 33 is secured upon a shaft 34 rotatably mounted in bearing members 35 suitably secured to upright 4, and is driven by a bevel gear 36 secured upon shaft 15 and meshing with a bevel gear 37 secured upon shaft 34. A latch member 38 is pivotally mounted at 39 upon a bracket 40 secured to lever 30 adjacent the upper end thereof and upon the side of the lever adjacent the mandrel. Member 38 includes a head 41 disposed to contact strips 29 of blocks 22, and a lower arm 42 bent into angular shape and extending outwardly about the rearward portion of lever 30. A tension spring 43, connecting arm 42 to a pin 44 secured in lever 30 adjacent the upper end thereof, urges arm 42 in a clockwise direction about pivot 39, as considered in Figure 7. Movement of the arm in such direction is limited by a stud 45 carried thereby and disposed to contact the outer side of the lever. The spring and stud 45 thus coact with lever 30 to normally hold head 41 in operative position. The inner portion of head 41 is bent at an angle to provide a finger 46 curved outwardly and away from the mandrel. This finger contacts strip 29 of the adjacent block 22 during outward movement of lever 30 so as to move head 41 outward laterally, about pivot 39, and cause it to clear the strip. When head 41 passes beyond strip 29 it is returned to operative postition by spring 43 and, upon inward movement of lever 30, contacts the strip for returning block 22 to its innermost or initial position. Preferably, the disc 33 is provided with a series of openings 47 disposed at different distances from the center thereof and providing selective points of attachment of link 32 for varying the throw of lever 30.

Frame 6 is provided, at the forward end thereof, with a head 48 disposed above the mandrel and outwardly beyond sleeve 23. A forming plate 49 is suitably secured, as by bolting, upon the under side of head 48. As will be noted more clearly from Figure 1, the under face of this plate is so formed that the central and left hand portion thereof, as viewed in this figure, extend about the corresponding portion of the mandrel concentrically therewith, and the right hand portion of the under face of the plate is flat and tangent to the central portion thereof. The mandrel is rotated in a counter-clockwise direction, as considered in Figure 1, and the skelp 50 is delivered to the mandrel from the right hand side of the machine, from a roll or reel supported in a suitable manner known in the art. The underface of plate 49 is disposed to exert appreciable pressure upon the skelp as it passes onto the mandrel, so as to assure that it is wound thereon under sufficient tension to be wrapped tightly and accurately upon the mandrel. This plate serves also to efficiently hold the wrapped skelp tightly about the mandrel and to prevent any unwinding or loosening thereof during the welding operation.

An electric welding head 51, of known type, is suitably mounted upon frame 6 and is so disposed that welding electrode 52 will contact the abutting edges of two convolutions of the skelp wound upon the mandrel, outwardly beyond and adjacent plate 49. A strip 53 of copper, which we term a fire strip, is set into each block 22 adjacent the outer end thereof. These strips have their outer faces flush with the outer faces of the blocks and are inclined transversely thereof so as to approximately form a spiral extending about the mandrel. The skelp passes over a table 54, suitably secured to base 1, and beneath angle guide strips 55 adjustably secured to the top of the table by bolts 56 passing through suitably disposed slots 57 in the table top. The top of table 54 is inclined downwardly and outwardly from the mandrel at such an angle that the skelp is delivered to the mandrel substantially tangent thereto, as in Fig. 1. Guide strips 55 are so adjusted that the skelp is delivered to the mandrel at an oblique angle transversely thereof, this angle depending upon the width of the skelp.

The pressure and guide strips 29 are disposed similarly to the fire strips 53, that is, strips 29 from an appropriate spiral extending about the mandrel. The pitch of the spirals formed by the strips 29 and the strips 53 conforms to the pitch of the convolutions of the skelp wound upon the mandrel, and the distance between the forward face of strip 29 and the transverse central portion of fire strip 53, of each block 22, corresponds to the width of the skelp.

Figure 3:
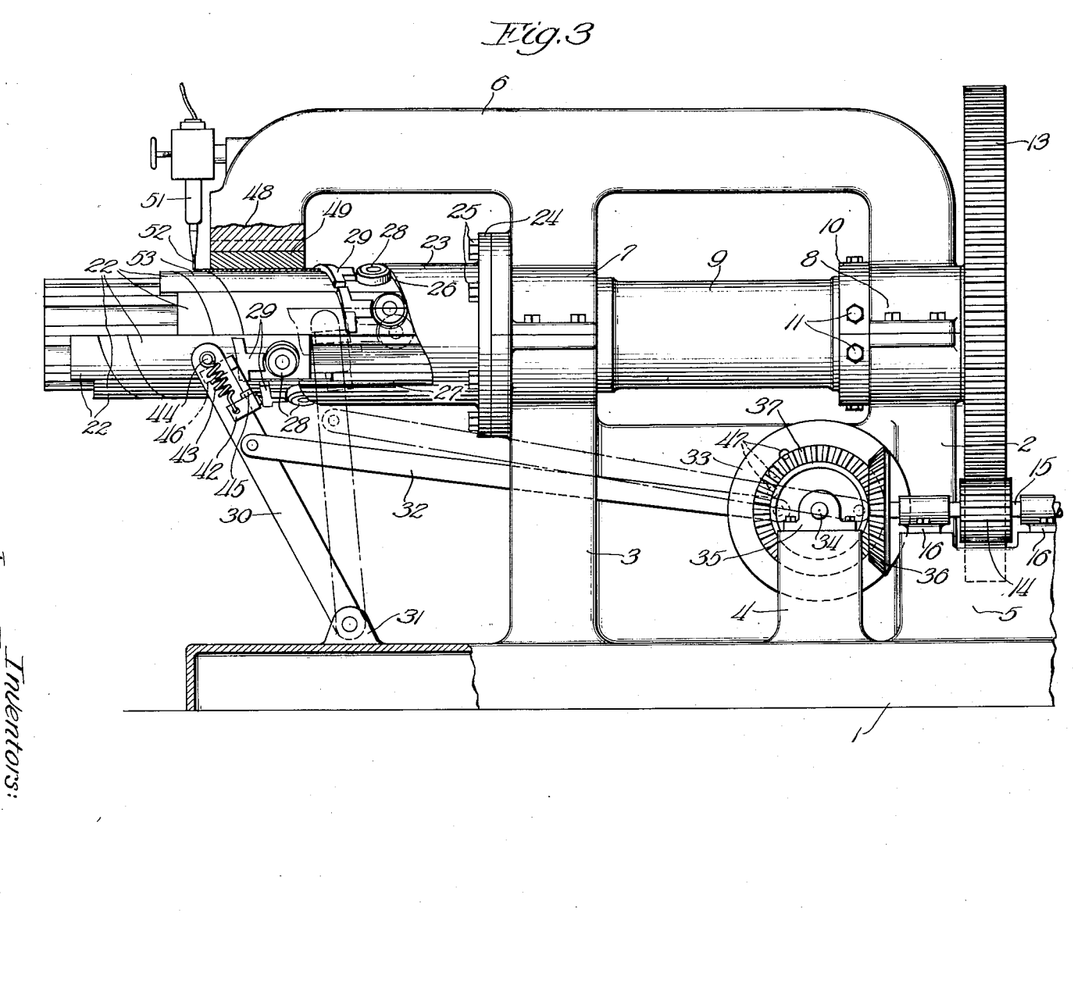
Figure 3 is a side view of the machine, partly broken away and in section.
Figure 4:
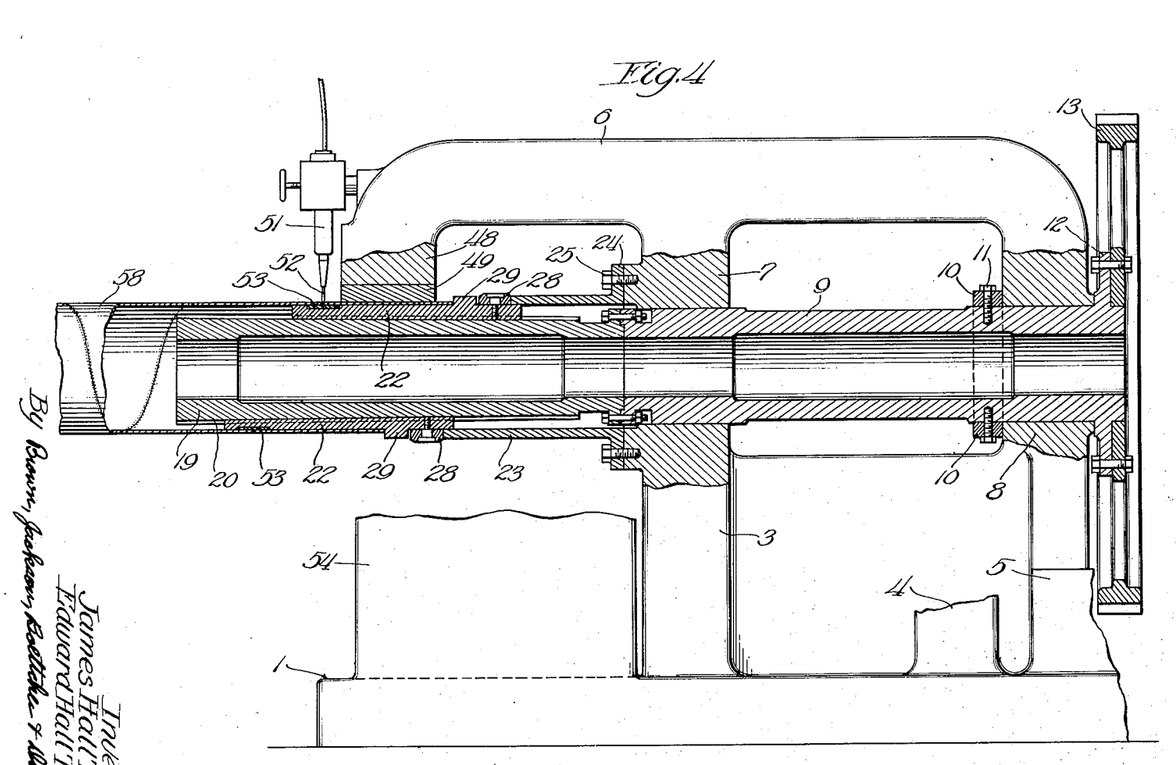
Figure 4 is a central vertical sectional view of the mandrel and associated parts, taken lengthwise thereof, parts of the machine being broken away and other parts being shown in elevation.

The reciprocation of lever 30 is so timed relative to the drive of the mandrel, that head 41 of member 38 contacts guide strips 29 of the key blocks 22, successively, during rearward movement of the lever and when each block passes off of the forward end of cam surface 26 and reaches a position immediately above shoulder 27. This will be clear from Figure 3, in which lever 30 is shown in its outermost position in full lines, with the latch member 38 disposed outwardly beyond strip 29 of the outermost block 22, the roller 28 of which has just passed off of the outer end of cam surface 26. In the rearward movement of lever 30 block 22 is moved rearwardly, and in the extreme inner or rearward position of the lever this block is disposed in its initial or starting position with roller 28 in contact with cam surface 26 adjacent the inner end thereof, as indicated by the dot and dash lines. During rotation of the mandrel, each block 22 is advanced progressively toward the outer end of the mandrel, until the roller of such block passes off of the forward end of cam surface 26, at which time the block is returned to its rearward or inner position by lever 30 and member 38. The blocks 22 are disposed in an approximate spiral about the spindle, and are successively shifted rearwardly and then forwardly, by the pull back lever 30 and cam surface 26.

During rotation of the mandrel the skelp is wound upon the outer faces of blocks 22 under appreciable tension, as previously described. In this connection, the guide strips 55 may coact with the top of table 54 to frictionally grip skelp 50 and supplement the action of the forming plate 49 in tensioning the skelp. As each block 22 is pulled back into its initial position, it is disposed well below the run of the skelp between the mandrel and table 54, and strip 29 of such block passes beneath the skelp without contacting therewith. This operation will be clear from Figures 1, 3 and 5. During continued rotation of the mandrel the block 22 is moved forwardly so as to bring strip 29 into contact with the rearward edge of that portion of the skelp which is being wound upon the mandrel. Strips 29 act to hold the forward edge of the turn or convolution of the skelp being wrapped in close and accurate contact with the rearward edge of the adjacent turn. These abutting edges are welded together by means of welding head 51 and electrode 52. The fire strips 53, being of copper, will not adhere to the skelp, and these strips provide an effective backing for the skelp during welding thereof. Obviously, the material of the fire strips may be varied as conditions may require, and the provision of fire strips may not be necessary in all cases.

The skelp is held tightly wrapped about the mandrel after welding, and during the continued turning of the mandrel through approximately 270°. The weld thus has ample opportunity to take its final set and a permanent and highly efficient weld is assured. This will be clear from Figures 1 and 3, from which it will be noted that the distance from the forward edge of the skelp beneath plate 49 to the outer end of the outermost block 22 is equal to the width of the skelp. As the skelp is wound upon the mandrel and welded to produce the tube or pipe 58, it is urged along the mandrel, toward the outer end thereof by strips 29 of blocks 22. The winding and welding of the skelp is a continuous operation, and the pipe as formed is shifted along the mandrel in accordance with the rate of winding of the skelp upon the mandrel. In the operation of the machine, the skelp is wound spirally upon a suitable mandrel, the contiguous edges of adjacent convolutions of the skelp are held in contact and welded together, the winding of the skelp upon the mandrel and the welding proceed as a continuous operation, and the pipe thus produced is moved lengthwise of the mandrel commensurate with the rate at which the skelp is wound upon the mandrel. This provides a simple and highly efficient machine for producing spirally wound pipe expiditiously and at low cost.

Figure 9:
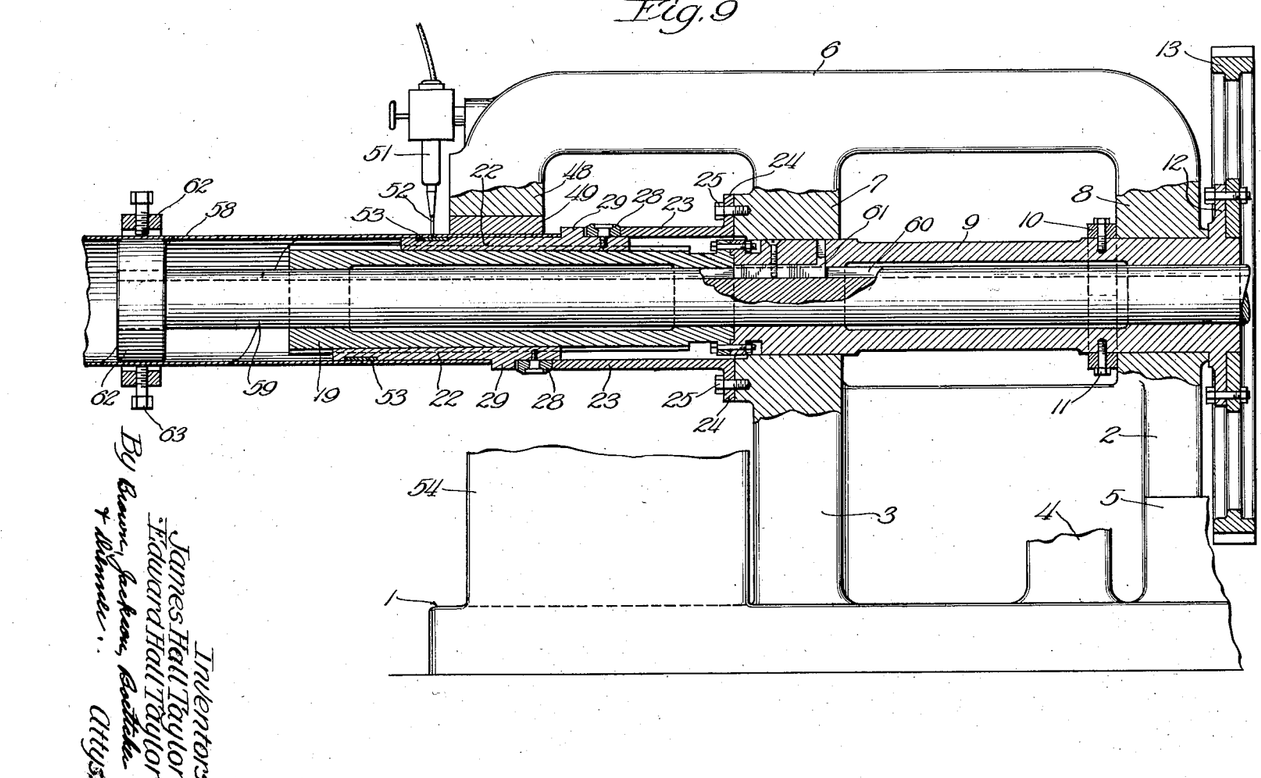
Figure 9 is a view similar to Figure 4 but illustrating a modification thereof.

In the form of machine illustrated in Figure 9, we provide a shaft 59 of suitable length which extends through shaft 9 and spindle 19. Shaft 59 has a key-way 60 extending lengthwise thereof, which receives a key 61 suitably secured to and disposed within shaft 9. A head 62 is suitably secured upon the forward end of shaft 59 and corresponds in diameter to the interior diameter of pipe 58. A ring 62 is disposed about pipe 58, in the plane of head 62, and clamping screws 63, threaded through this ring, provide means for securing the pipe to the head 62. In starting, a suitable length of the skelp is given several wraps about the mandrel, and the end of the skelp is then clamped to head 62 by screws 63. The machine is then operated as before and shaft 59 is rotated with shaft 9, and is also moved lengthwise through shaft 9 and mandrel 59 in accordance with the lengthwise movement of the pipe as it is formed. When shaft 59 reaches its extreme outward position, or previously if desired, by loosening screws 63 the pipe may be released from head 62, after which shaft 59 may be returned to its rearward position and the pipe clamped to the head as before. In both forms of the machine illustrated, after a suitable length of pipe has been formed it is cut off by means of a friction saw, or other suitable means known in the art.

Shaft 59 and the associated clamping means, provide positive means for securing the skelp and eliminate possibility of slippage between the same and the mandrel. Under ordinary conditions, however, this is not necessary, since the skelp is wound upon the mandrel under considerable tension and the frictional contact between the windings or convolutions of the skelp and the mandrel is amply sufficient to prevent any slippage.

Preferably, the mandrel 19 tapers slightly in diameter toward its inner end. The amount of taper may vary within limits, though we find a taper of one thirty-second of an inch suitable for most purposes. Since the skelp is wound upon blocks 22, and these blocks are moved toward the outer end of the mandrel during the winding operation, this tapering of the mandrel, in conjunction with the blocks, provides an expanding mandrel. This produces a slight wedging action which assures tight frictional contact between the formed pipe and the mandrel which effectively prevents possibility of slippage of the pipe about the mandrel or vice versa. This tapering of the mandrel is not essential, however, in all cases, and may be omitted.

In initially starting winding of the skelp upon the mandrel, in the machine of Figures 1 to 4, the end portion of the skelp may be wrapped manually about the mandrel and held in a suitable manner while the machine is operated and until several succeeding windings of the skelp have been welded together as previously described. Thereafter, the machine is operated in the manner above described. It is also possible, when starting, to place a short length of a previously formed pipe upon the mandrel, the end of the skelp being welded or otherwise suitably secured to such length of pipe, after which the machine is operated as before.

As above indicated, and as will be apparent to those skilled in the art, changes may be resorted to in the machine of our invention without departing from the field and scope of the same. We intend, therefore, to include in this application, in which the preferred forms only of our invention have been illustrated and described, all such variations as fall within the scope of the appended claims.

What we claim is:—

1. In a machine of the character stated, a rotating mandrel including blocks mounted for reciprocation lengthwise of the mandrel, means for progressively moving the blocks toward the outer end of the mandrel during each revolution thereof and for successively returning the blocks to initial position at the end of each revolution of the mandrel, welding means disposed to weld together the edges of adjacent convolutions of metal strip wound spirally upon the mandrel, and means carried by the blocks and contacting the rearward edge of the strip for advancing said strip toward the outer end of the mandrel at a rate commensurate with the rate of winding of the strip upon the mandrel.

2. In a machine of the character stated, a rotating mandrel including blocks mounted for reciprocation lengthwise of the mandrel, a fixed cam extending substantially spirally about the mandrel and lengthwise toward the outer end thereof, the blocks having means cooperating with the cam for progressively moving said blocks toward the outer end of the mandrel during rotation thereof, pressure and guide strips extending transversely of the blocks and defining an approximate spiral extending about the mandrel, welding means disposed outwardly of the mandrel beyond said strips, and means for successively returning the blocks to operative relation to the inner end of the cam as the blocks pass beyond the outer end of said cam in the rotation of the mandrel.

3. In a machine of the character stated, a rotating mandrel including blocks mounted for reciprocation lengthwise of the mandrel, a fixed cam extending substantially spirally about the mandrel and lengthwise toward the outer end thereof, the cam including a shoulder connecting the outer end and the inner end of the cam, said blocks having means associated therewith and contacting the cam, a forming plate remote from said shoulder and disposed adjacent and concentric with a portion of the mandrel, welding means disposed outwardly of and adjacent said plate, pressure and guide strips carried by the blocks and disposed equidistant from the cam contacting means of the respective blocks, the outer faces of said strips being inclined transversely of the blocks and outwardly toward the outer end of the mandrel, and means for successively returning the blocks to operative relation to the inner end of the cam as they pass beyond said shoulder in the rotation of the mandrel.

4. In a machine of the character stated, a rotating mandrel including blocks mounted for reciprocation lengthwise of the mandrel, a fixed cam extending substantially spirally about the mandrel and lengthwise toward the outer end thereof, the cam including a shoulder connecting the outer end and the inner end of the cam, said blocks having means associated therewith and contacting the cam, a forming plate remote from said shoulder and disposed adjacent and concentric with a portion of the mandrel, welding means disposed outwardly of and adjacent said plate, pressure and guide strips carried by the blocks and disposed equidistant from the contacting means of the respective blocks, the outer faces of said strips being inclined transversely of the blocks and outwardly toward the outer end of the mandrel, a strip of metal carried by each block and having its outer face flush with the outer face of the block, said metal strips being disposed to pass beneath the welding means in the rotation of the mandrel, and means for successively returning the blocks to operative relation to the inner end of the cam as they pass beyond said shoulder.

5. In a machine of the character stated, a rotating mandrel including blocks mounted for reciprocation lengthwise of the mandrel, a fixed cam extending substantially spirally about the mandrel and lengthwise toward the outer end thereof, the cam including a shoulder connecting the outer end and the inner end of the cam, said blocks having means associated therewith and contacting the cam, a forming plate remote from said shoulder and disposed adjacent and concentric with a portion of the mandrel, welding means disposed outwardly of and adjacent said plate, pressure and guide strips carried by the blocks and disposed equidistant from the cam contacting means of the respective blocks, the outer faces of said strips being inclined transversely of the blocks and outwardly toward the outer end of the mandrel, strips carried by the blocks and flush with the outer faces thereof, said block strips being inclined similarly to and equidistant from the pressure and guide strips and disposed to pass beneath the welding means in the rotation of the mandrel, and means for successively returning the blocks to operative relation to the inner end of the cam as they pass beyond said shoulder.

6. In a machine of the character stated, a rotating mandrel including blocks mounted for reciprocation lengthwise of the mandrel, means for progressively moving the blocks outwardly during rotation of the mandrel and for returning each of the blocks to its innermost position at the end of each complete revolution thereof with the mandrel, welding means mounted adjacent the mandrel, and strips carried by the blocks and disposed to pass beneath the welding means in the rotation of the mandrel.

7. In a machine of the character stated, a rotating mandrel including blocks mounted for reciprocation lengthwise of the mandrel, means for progressively moving the blocks outwardly during rotation of the mandrel and for returning each of the blocks to its innermost position at the end of each complete revolution thereof with the mandrel, and welding means mounted adjacent the mandrel, the blocks being disposed to pass beneath the welding means in the rotation of said mandrel.

8. In a machine of the character stated, a rotating mandrel including a spindle and blocks mounted thereon for reciprocation lengthwise of the mandrel, said spindle tapering in diameter from its outer end, means for progressively moving the blocks outwardly during rotation of the mandrel and for returning each of the blocks to its innermost position at the end of each complete revolution thereof with the mandrel, and welding means mounted adjacent the mandrel.

9. In a machine of the character stated, a rotating mandrel, means for delivering metal strip to the mandrel obliquely thereof to be wound spirally upon the mandrel, a shaft freely slidable through the mandrel and connected to said mandrel to rotate therewith, means for advancing the wound strip toward the outer end of the mandrel, means for securing the strip to the shaft adjacent the outer end of the mandrel, and means for welding together the edges of adjacent convolutions of the wound strip.

10. In a machine of the character stated, a rotating mandrel, means for delivering metal strip to the mandrel obliquely thereof to be wound spirally upon the mandrel, a shaft freely slidable through the mandrel and connected to said mandrel to rotate therewith, a head secured to the shaft, a ring concentric with the head and provided with means cooperating therewith for securing the strip to the head adjacent the outer end of the mandrel, means for advancing the wound strip toward the outer end of the mandrel, and means for welding together the edges of adjacent convolutions of the wound strip.

11. In a machine of the character stated, a frame including spaced bearing members, a rotating shaft mounted at its ends in said bearing members, a mandrel including a spindle detachably secured at one end to one end of the shaft coaxially and for rotation therewith, a cam detachably secured to the bearing member adjacent the end of the shaft to which the spindle is secured, said cam extending about and outwardly of the spindle, blocks mounted on the spindle for reciprocation lengthwise thereof and moved outwardly of the spindle by said cam, means for successively returning the blocks to initial position, said blocks having means for contacting a metal strip wound spirally upon the mandrel and for advancing the wound strip toward the outer end of the mandrel, the frame having a member extending along the mandrel, a forming block carried by said frame member and extending about a portion of the mandrel in proximity thereto, and welding means disposed outwardly beyond and adjacent said block.

12. In a machine of the character stated, a frame including an inner bearing member and an outer bearing member, a rotating shaft mounted at its ends in said members, a mandrel including a spindle detachably secured at one end to the end of the shaft adjacent the outer side of the inner bearing member, means for guiding a metal strip and advancing it toward the outer end of the mandrel as the strip is wound spirally upon the mandrel during rotation thereof, said means including a cam member detachably secured to said inner bearing member and extending outwardly along and about the spindle, a forming block extending about a portion of the mandrel and disposed outwardly beyond the cam member, and welding means disposed outwardly beyond the block.

13. In a machine of the character stated, a tubular drive shaft, bearing members extending about each end of and rotatably supporting the shaft, a mandrel including a tubular spindle detachably secured at one end to one end of the shaft coaxially and for rotation therewith, a securing shaft slidable through the spindle and the drive shaft and connected thereto for rotation therewith, said securing shaft having a snug fit through the ends of the spindle and the drive shaft, means for attaching a strip of material to said securing shaft adjacent the outer end of the spindle for winding the strip spirally upon the mandrel during rotation thereof, means for advancing the wound strip toward the outer end of the mandrel, and means for welding together the edges of adjacent convolutions of the wound strip.

14. In a machine of the character stated, a drive shaft, bearing members extending about each end of and rotatably supporting the shaft, a mandrel including a spindle detachably secured at one end to one end of the drive shaft coaxially and for rotation therewith, means for guiding metal strip and for delivering it to the mandrel at an oblique angle transversely thereof to be wound spirally upon the mandrel during rotation thereof and with the edges of adjacent convolutions of the wound strip in close proximity, means for advancing the wound strip toward the outer end of the mandrel, and means for welding together the edges of adjacent convolutions of the wound strip.

15. In a machine of the character stated, a rotating mandrel, means for delivering metal strip to the mandrel at an oblique angle transversely thereof to be wound spirally upon the mandrel, means movable toward the outer end of the mandrel and positioned to contact the following edge of the strip upon the mandrel during outward movement of said means for positively feeding the wound strip toward the outer end of the mandrel, means for guiding the strip and for disposing the edges of adjacent convolutions of the wound strip in close proximity, and means for welding together the edges of adjacent convolutions of the strip as it is wound upon said mandrel.

16. In a machine of the character stated, a rotating and radially expansible mandrel, means for delivering metal strip to the mandrel at an oblique angle transversely thereof to be wound upon the mandrel, means for increasing the effective diameter of the mandrel to a predetermined extent sufficient to assure close frictional contact thereof with the wound strip, means for guiding the strip and for disposing the edges of adjacent convolutions of the wound strip in close proximity, and means for welding together the edges of adjacent convolutions of the strip as it is wound upon said mandrel.

17. In a machine of the character stated, a rotating and radially expansible mandrel, means for delivering metal strip to the mandrel at an oblique angle transversely thereof to be wound upon the mandrel, means for increasing the effective diameter of the mandrel to a predetermined extent sufficient to assure close frictional contact thereof with the wound strip, and for advancing the wound strip along the mandrel toward the outer end thereof, means for guiding the strip and for disposing the edges of adjacent convolutions of the wound strip in close proximity, and means for welding together the edges of adjacent convolutions of the strip as it is wound upon said mandrel.

18. In a machine of the character stated, a frame including spaced bearing members, a shaft rotatably mounted in said members, a mandrel including a spindle detachably secured at one end to the shaft coaxially and for rotation therewith, a cam detachably secured to one of the bearing members and extending about and outwardly of the spindle, means for delivering metal strip to the mandrel at an oblique angle transversely thereof to be wound spirally upon the mandrel with the edges of adjacent convolutions of the wound strip in close proximity, means for welding together the edges of adjacent convolutions of the strip as it is wound upon the mandrel, and means cooperating with said cam for advancing the wound strip along the mandrel toward the outer end thereof.

19. In a machine of the character stated, a rotating mandrel including blocks mounted for reciprocation lengthwise of the mandrel, means for progressively moving the blocks toward the outer end of the mandrel during each revolution thereof and for successively returning the blocks to initial position at the end of each revolution of the mandrel, welding means disposed to weld together adjacent convolutions of metal strip wound spirally upon the mandrel, and means carried by the blocks and contacting the rearward edge of the strip for advancing said strip toward the outer end of the mandrel at a rate commensurate with the rate of winding of the strip upon the mandrel.

20. In a machine of the character stated, a rotating mandrel, means for delivering metal strip to the mandrel obliquely thereof to be wound spirally upon the mandrel, a shaft freely slidable through the mandrel and connected to said mandrel to rotate therewith, means for advancing the wound strip toward the outer end of the mandrel, means for securing the strip to the shaft adjacent the outer end of the mandrel, and means for welding together adjacent convolutions of the wound strip.

21. In a machine of the character stated, a rotating mandrel, means for delivering metal strip to the mandrel obliquely thereof to be wound spirally upon the mandrel, a shaft freely slidable through the mandrel and connected to said mandrel to rotate therewith, a head secured to the shaft, a ring concentric with the head and provided with means cooperating therewith for securing the strip to the head adjacent the outer end of the mandrel, means for advancing the wound strip toward the outer end of the mandrel, and means for welding together adjacent convolutions of the wound strip.

22. In a machine of the character stated, a tubular drive shaft, bearing members extending about each end of and rotatably supporting the shaft, a mandrel including a tubular spindle detachably secured at one end to one end of the shaft coaxially and for rotation therewith, a securing shaft slidable through the spindle and the drive shaft and connected thereto for rotation therewith, said securing shaft having a snug fit through the ends of the spindle and the drive shaft, means for attaching a strip of material to said securing shaft adjacent the outer end of the spindle for winding the strip spirally upon the mandrel during rotation thereof, means for advancing the wound strip toward the outer end of the mandrel, and means for welding together adjacent convolutions of the wound strip.

23. In a machine of the character stated, a drive shaft, bearing members extending about each end of and rotatably supporting the shaft, a mandrel including a spindle detachably secured at one end to one end of the drive shaft coaxially and for rotation therewith, means for guiding metal strip and for delivering it to the mandrel at an oblique angle transversely thereof to be wound spirally upon the mandrel during rotation thereof and with the edges of adjacent convolutions of the wound strip in close proximity, means for advancing the wound strip toward the outer end of the mandrel, and means for welding together adjacent convolutions of the wound strip.

24. In a machine of the character stated a rotating mandrel, means for delivering metal strip to the mandrel at an oblique angle transversely thereof to be wound spirally upon the mandrel, means movable toward the outer end of the mandrel and positioned to contact the following edge of the strip upon the mandrel during outward movement of said means for positively feeding the wound strip toward the outer end of the mandrel, means for guiding the strip and for disposing the edges of adjacent convolutions of the wound strip in close proximity, and means for welding together adjacent convolutions of the strip as it is wound upon said mandrel.

25. In a machine of the character stated, a rotating and radially expansible mandrel, means for delivering metal strip to the mandrel at an oblique angle transversely thereof to be wound upon the mandrel, means for increasing the effective diameter of the mandrel to a predetermined extent sufficient to assure close frictional contact thereof with the wound strip, means for guiding the strip and for disposing the edges of adjacent convolutions of the wound strip in close proximity, and means for welding together adjacent convolutions of the strip as it is wound upon said mandrel.

26. In a machine of the character stated, a rotating and radially expansible mandrel, means for delivering metal strip to the mandrel at an oblique angle transversely thereof to be wound upon the mandrel, means for increasing the effective diameter of the mandrel to a predetermined extent sufficient to assure close frictional contact thereof with the wound strip, and for advancing the wound strip along the mandrel toward the outer end thereof, means for guiding the strip and for disposing the edges of adjacent convolutions of the wound strip in close proximity, and means for welding together adjacent convolutions of the strip as it is wound upon said mandrel.

27. In a machine of the character stated, a frame including spaced bearing members, a shaft rotatably mounted in said members, a mandrel including a spindle detachably secured at one end to the shaft coaxially and for rotation therewith, a cam detachably secured to one of the bearing members and extending about and outwardly of the spindle, means for delivering metal strip to the mandrel at an oblique angle transversely thereof to be wound spirally upon the mandrel with the edges of adjacent convolutions of the wound strip in close proximity, means for welding together adjacent convolutions of the strip as it is wound upon the mandrel, and means cooperating with said cam for advancing the wound strip along the mandrel toward the outer end thereof.

JAMES HALL TAYLOR.
EDWARD HALL TAYLOR.